Patented May 24, 1949

2,471,091

UNITED STATES PATENT OFFICE 2,471,091

3-THENYL BROMIDE

Ernest E. Campaigne and William M. Le Suer, Bloomington, Ind., assignors to Indiana University Foundation, Monroe County, Ind., a corporation of Indiana No Drawing. Application November 28, 1947, Serial No. 788,664

6 Claims. (Cl. 260—329)

The present invention relates to the preparation of 3-thenyl bromide and is more particularly concerned with a method for the preparation thereof from 3-methyl thiophene and N-bromosuccinimide. The invention is further concerned with the novel product of the reaction, 3-thenyl bromide, having the following structural formula:

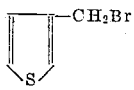

It is an object of the present invention to provide the novel compound, 3-thenyl bromide, which is a valuable intermediate in the preparation of more complex organic compounds having pharmacological activity. An additional object of the invention is the provision of a process for the preparation of 3-thenyl bromide by the reaction of 3-methylthiophene and N-bromosuccinimide. Other objects of the invention will become apparent hereinafter.

The novel product of the present invention is a lachrymatory oil which has a boiling point of approximately 75-78 degrees centigrade at 1 millimeter of mercury pressure absolute, a $d_4^{20}$ of about 1.635 and a $n_D^{20}$ of about 1.604. 3-thenyl bromide is unstable, but no appreciable decomposition of the product is noted upon distillation under reduced pressure.

The process of the present invention essentially comprises the reaction of 3-methylthiophene and N-bromosuccinimide in the presence of a small amount of peroxide catalyst. That bromination should occur in the methyl group is unexpected, inasmuch as the highly reactive 2 and 5 positions of the thiophene nucleus are open for reaction.

The N-bromosuccinimide employed should be of a good technical quality, the procedure of Zeigler et al., Ann., 551, 80 (1942), being satisfactory. A good grade of succinimide should be employed in its preparation, the procedure of Clarke and Behr, "Organic Synthesis," Coll., vol. II (1943), p. 562, being suitable for preparation of this intermediate. It is advantageous to wash the N-bromosuccinimide thoroughly with water prior to use in order to remove excess bromine, and the agent appears most active after allowing bromine to escape through storage in the open air.

An organic peroxide catalyst has been found necessary for attainment of the desired product in high yields. Benzoyl peroxide, perbenzoic acid and acetyl peroxide are representative of the type of catalyst which may be employed, with the first mentioned being preferred. The catalyst may be present in amount from about traces to about 0.04 mole per mole of the 3-methylthiophene, or higher, with no advantages being noticeable outside the range from traces to about 0.02 mole per mole of 3-methylthiophene.

The reaction may be conveniently conducted by mixing together equimolar proportions of 3-methylthiophene and N-bromosuccinimide, in the presence of the peroxide catalyst, e. g., benzoyl peroxide, and maintaining the reactants in contact with each other for a sufficient period of time, e. g., six hours. Other proportions may be used, if desired, but do not produce any material advantage. Intimate contact of the reactants may be accomplished by agitation and refluxing at the boiling point of the particular solvent employed. Temperatures in the range of about 20 degrees to about 130 degrees centigrade are suitable, with the reflux temperature of the solvent, e. g., carbon tetrachloride (75-85 degrees centigrade), being preferred. Carbon tetrachloride, benzene, and petroleum ether, may be mentioned as reaction media. but other common organic solvents which are inert to the reactants and reaction products under the conditions employed will be found suitable. Additional peroxide may be added from time to time as required, advantageously with shaking to accomplish dispersion of the catalyst throughout the mixture of reactants. After a sufficient reaction period, e. g., six hours, heating may be discontinued, the reaction product cooled, succinimide filtered from the product, and the product freed of solvent by distillation under reduced pressure and purified according to conventional procedure. Yields as high as 65 per cent may be obtained by operating according to this process.

The following example is given to illustrate the practice of the present invention, but is not to be construed as limiting.

Eighty-eight and one-half grams (0.5 mole) of N-bromosuccinimide and 0.2 gram of benzoyl peroxide were added to a solution of 55 grams (0.56 mole) of 3-methylthiophene in 150 milliliters of carbon tetrachloride. The reaction flask was shaken vigorously to disperse the peroxide and heating was commenced. An additional 0.2 gram of benzoyl peroxide was added to the flask during the first ten minutes of heating, and the flask and contents were shaken vigorously during the first hour of heating. After an additional five hours of refluxing, the flask was cooled in an ice-bath. Succinimide was removed by suction filtration and washed with carbon tetrachloride. The wash was then added to 50 milliliters of the main carbon tetrachloride solution, together with the solution from an identical run, prior to removal of solvent by distillation under reduced pressure. The highly lachrymatory oil which remained was distilled under a vacuum and 114 grams of light tan oil collected at 60–100 degrees centigrade at 2 millimeters of mercury pressure. This material darkened slowly upon standing. Purification yielded a sample boiling at about 75–78 degrees centigrade at 1 millimeter of mercury pressure absolute; $d_4^{20}$ 1.635, $n_D^{20}$ 1.604.

This product was converted to its hexamethylenetetramine salt by refluxing with 90 grams of hexamethylenetetramine in chloroform solution. The salt exists as white needles which soften at 120 degrees centigrade and melt with browning at 150 degrees centigrade.

*Anal.*—Calcd. for $C_{11}H_{17}N_4SBr$: S, 10.10
 Found: S, 9.80

Various modifications may be made in the present invention without departing from the spirit or scope thereof, and it is to be understood that we limit ourselves only as defined in the appended claims.

We claim:

1. The process which includes: mixing together 3-methylthiophene and N-bromosuccinimide in the presence of an organic peroxide catalyst, at a temperature between about 20 degrees and about 130 degrees centigrade.

2. The process of claim 1, wherein the peroxide catalyst is benzoyl peroxide.

3. The process which includes: mixing together 3-methylthiophene, N-bromosuccinimide, and a catalytic amount of benzoyl peroxide, in an organic solvent inert to the reactants under the conditions of reaction, at a temperature between about 20 degrees and about 130 degrees centigrade, and separating from the reaction product 3-thenyl bromide.

4. The process of claim 3, wherein the 3-methylthiophene and N-bromosuccinimide are present in approximately equimolar proportions.

5. The process of claim 3, wherein the organic solvent is carbon tetrachloride.

6. 3-thenyl bromide, having the formula:

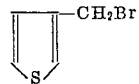

ERNEST E. CAMPAIGNE.
WILLIAM M. LE SUER.

No references cited.